United States Patent

Nies et al.

[15] 3,649,172

[45] Mar. 14, 1972

[54] ZINC BORATE OF LOW HYDRATION AND METHOD FOR PREPARING SAME

[72] Inventors: Nelson P. Nies, Laguna Beach; Richard W. Hulbert, Anaheim, both of Calif.

[73] Assignee: United States Borax & Chemical Corporation, Los Angeles, Calif.

[22] Filed: Dec. 21, 1970

[21] Appl. No.: 100,526

Related U.S. Application Data

[63] Continuation-in-part of Ser. No. 648,968, June 26, 1967, Pat. No. 3,549,316.

[52] U.S. Cl. ................................................................23/59
[51] Int. Cl. .........................................................C01b 25/00

[58] Field of Search .......................................................23/59

[56] References Cited

UNITED STATES PATENTS

| | | |
|---|---|---|
| 2,405,366 | 8/1946 | Myhren et al..............................23/59 |
| 3,126,352 | 3/1964 | Blair et al................................23/59 X |

*Primary Examiner*—Herbert T. Carter
*Attorney*—James R. Thornton

[57] ABSTRACT

Crystalline zinc borate having the composition $2ZnO \cdot 3B_2O_3 \cdot 3.3-3.7 H_2O$ and its preparation by reaction of alkali metal borate with a zinc salt in an aqueous solution.

11 Claims, No Drawings

ZINC BORATE OF LOW HYDRATION AND METHOD FOR PREPARING SAME

This is a continuation-in-part of our copending application, Ser. No. 648,968 filed June 26, 1967, now U.S. Pat. No. 3,549,316.

This invention relates to a novel crystalline zinc borate and a process for its preparation. The compound of the present invention contains much less water of hydration than previous hydrated zinc borates. Since it contains less water of hydration, the zinc borate of this invention provides advantages in shipping and use especially when used as a fire retardant additive for polymers. The present zinc borate is especially useful as a fire-retardant additive for polymers. It can be processed with the polymers at much higher temperatures than previous zinc borates because of its low water of hydration and the fact that it loses water at a much higher temperature than previous zinc borates. Therefore, there is much less tendency to form voids in the plastic during processing at elevated temperatures.

The crystalline zinc borate of the present invention is prepared by forming an aqueous solution of an alkali metal borate with a water-soluble zinc salt and maintaining the aqueous solution at a temperature of at least about 70° C., preferably in the range of about 90°–100° C., thereby forming the zinc borate which crystallizes from the solution and is separated therefrom by filtration, centrifugation and the like. Previous methods for forming zinc borate such as those described by Myhren et al., U.S. Pat. No. 2,405,366, and Blair et al., U.S. Pat. No. 3,126,352, were at much lower temperatures, such as about room temperature, and therefore, the novel crystalline zinc borate of the present invention was not produced. For example, Myhren et al. obtained a zinc borate of the composition $2ZnO \cdot 3B_2O_3 \cdot 7 H_2O$ and Blair et al. produced a zinc borate gel having a high level of hydration instead of a crystalline material.

The zinc salt employed in the present process is water soluble, preferably an inorganic zinc salt, such as zinc sulfate, zinc bromide, zinc chloride, zinc nitrate and the like. Because of ready availability and economy, zinc sulfate and zinc chloride are preferred. The alkali metal borate is preferably sodium tetraborate, also known as borax ($Na_2B_4O_7$), or potassium tetraborate. The zinc salts and borates used as starting materials can have water of hydration, but when dissolved in the aqueous me;ium the amount of water of hydration possessed by the starting material is immaterial.

The ratio of zinc salt to borate is critical. In order to produce the desired crystalline zinc borate of this invention, the zinc salt to sodium or potassium tetraborate molar ratio should be 1–1.5. Preferably, the molar ratio of reactants is adjusted so that some boric acid is present in the reaction product mixture. Also, a minor amount of sodium metaborate can be included in the aqueous medium as a reactant either by adding the sodium metaborate as such or forming it in situ by the addition of a minor amount of sodium hydroxide. Alternatively, a minor amount of zinc oxide can also be included in the aqueous medium with suitable adjustment of the molar ratios of the other reactants. Preferably, when zinc oxide is added to the aqueous medium the molar ratio of zinc salt:sodium tetraborate:zinc oxide is about 7:7:1. When sodium metaborate or NaOH are added, the zinc salt:sodium tetraborate:sodium metaborate ($NaBO_2$) molar ratio is preferably 4:3:2.

The following equations illustrate typical reactions according to the present invention in which the water of hydration of the reactants is ignored.

a. $2ZnSO_4 + 2Na_2B_4O_7 \rightarrow 2ZnO \cdot 3B_2O_3 \cdot 3.5H_2O + 2Na_2SO_4 + 2H_3BO_3$ b. $2ZnCl_2 + 2Na_2B_4O_7 \rightarrow 2ZnO \cdot 3B_2O_3 \cdot 3.5H_2O + 4NaCl + 2H_3BO$ c. $2ZnBr_2 + 2Na_2B_4O_7 \rightarrow 2ZnO \cdot 3B_2O_3 \cdot 3.5H_2O + 4NaBr + 2H_3BO$ d. $2Zn(NO_3)_2 + 2Na_2B_4O_7 \rightarrow 2ZnO \cdot 3B_2O_3 \cdot 3.5H_2O + 4NaNO_3 + b8H_3BO_3$ e. $2ZnSO_4 + 2K_2B_4O_7 \rightarrow 2ZnO \cdot 3B_2O_3 \cdot 3.5H_2O + 2K_2SO_4 + 2H_3BO_3$ f. $1.5ZnSO_4 + 1.5Na_2B_4O_7 + 0.5ZnO \rightarrow 2ZnO \cdot 3B_2O_3 \cdot 3.5H_2O + 1.5Na_2SO_4$ g. $3.5ZnSO_4 + 3.5Na_2B_4O_7 + 0.5ZnO \rightarrow 2(2ZnO \cdot 3B_2O_3 \cdot 3.5H_2O) + 3.5NaSO_4 + 2H_3BO_3$ h. $2ZnSO_4 + 1.5Na_2B_4O_7 + NaBO_2 \rightarrow 2ZnO \cdot 3B_2O_3 \cdot 3.5H_2O + H_3BO_3 + 2Na_2SO_4$ i. $2ZnSO_4 + 1.75Na_2B_4O_7 + 0.5NaOH \rightarrow 2ZnO \cdot 3B_2O_3 \cdot 3.5H_2O + H_3BO_3 + 2Na_2SO_4$ j. $2ZnSO_4 + 1.5Na_2B_4O_7 + NaOH \rightarrow 2ZnO \cdot 3B_2O_3 \cdot 3.5H_2O + 2Na_2SO_4$ h. $2ZnSO_4 + 1.5Na_2B_4O_7 + NaBO_2 \rightarrow 2ZnO \cdot 3B_2O_3 \cdot 3.5H_2O + 3.5K_2SO_4 + 2H_3BO_3$ It will be noted in equation (i) above that the addition of 0.5 mole NaOH to 1.75 mole $Na_2B_4O_7$ forms a mixture of 1.5 mole $Na_2B_4O_7$ and 1 mole $NaBO_2$ (sodium metaborate) which is the same as the reactant mixture of equation (h).

In order to accelerate crystallization of the desired zinc borate, a small amount of seed crystals of previously prepared $2ZnO \cdot 3 B_2O_3 \cdot 3.5H_2O$ preferably is present in the reaction mixture. The seed crystals can be either added to the reaction mixture or carried over by use of mother liquor or reaction vessels employed in the preparation of previous batches.

The following examples illustrate the preparation of the crystalline zinc borate of the present invention.

EXAMPLE I

To 668 g. of water in a reaction flask was added 234.6 g. of zinc chloride, 564 g. of sodium tetraborate decahydrate and 32 g. of 50 percent sodium hydroxide solution. Zinc borate-3.5 hydrate seed crystal (4 g.) was added to the flask and the mixture stirred for 24 hours at about 95° C. The resultant mixture was cooled and the crystalline product removed by filtration, washed with water and methanol, and then air dried. A yield of 357 g. (96.5 percent) of zinc borate having the following analysis was obtained:

38.01 g. ZnO
48.16 g. $B_2O_3$
13.83 $H_2O$ (by difference)
Formula: $2.02 ZnO \cdot 3B_2O_3 \cdot 3.33 H_2O$ the identity of the compound was confirmed by X-ray analysis.

EXAMPLE II

To a reaction flask containing 816 g. of water was added 311.9 g. of zinc sulfate, 552.4 g. of sodium tetraborate pentahydrate and 1 g. of previously prepared zinc borate-3.5 hydrate seed crystal. The mixture was stirred and maintained at a temperature of 97° C. After about 40 minutes an exothermic mixture occurred which raised the temperature to the boiling point (103° C.). After 6 hours, the reaction mixture was cooled and the crystalline product removed by filtration, washed with water and methanol and dried in air. A 77 percent yield of zinc borate, $2ZnO \cdot 3B_2O_3 \cdot 3.5 H_2O$, was obtained. The identity of the product was confirmed by X-ray analysis.

EXAMPLE III

To a reaction flask containing 877 g. of water was added 311.9 g. of zinc sulfate, 414.3 g. of sodium tetraborate pentahydrate, and 77.3 g. of 50 percent sodium hydroxide solution. Previously prepared zinc borate-3.5 $H_2O$ seed crystals (1 g.) were added and the reaction mixture stirred at a temperature of 97° C. After stirring overnight at 97° C., the product was separated as above. A yield of 418 g. of $2ZnO \cdot 3B_2O_3 \cdot 3.5H_2O$ was obtained. The identity of the product was confirmed by X-ray analysis.

EXAMPLE IV

To 773.4 g. of water in a reaction flask was added 154.2 g. of 96 percent $H_2SO_4$ and 122.8 g. ZnO to give a zinc sulfate solution. To this stirred solution at 100° C. was added 432 g. of sodium tetraborate pentahydrate and 17.6 g. of zinc oxide. Previously prepared zinc borate-3.5 hydrate seed crystals (1 g.) were added and the resultant reaction mixture was stirred at 95° C. for 5.5 hours. The mixture was cooled and the crystalline product separated by filtration, washed with water and methanol and air dried to give 380 g. of zinc borate having the following analysis:

37.85% ZnO
47.65% $B_2O_3$
14.5% $H_2O$ (by difference)

corresponding to the formula $2.04ZnO \cdot 3B_2O_3 \cdot 3.53 H_2O$. The identity was confirmed by X-ray analysis.

EXAMPLE V

To 782.7 g. of water in a reaction vessel was added 175.8 g. of 96 percent $H_2SO_4$ and 140.4 g. of zinc oxide to give a zinc sulfate solution. The solution was heated to 90° C. and 432 g. of sodium tetraborate pentahydrate added with stirring. The temperature was maintained at 90° and 34.5 g. of 50 percent NaOH added. Previously prepared zinc borate-3.5 hydrate seed crystals (1 g.) was added and the reaction mass stirred at 95° C. for 5.5 hours. The resultant mixture was cooled and the crystalline product separated by filtration, washed and dried to give 376 grams of the product which analyzed as follows:

ZnO   37.9%
$B_2O_3$   47.27%
$H_2O$   14.38% (by difference)

Formula: $2.04 ZnO \cdot 3B_2O_3 \cdot 3.49H_2O$.

The identity of the product was confirmed by X-ray analysis.

The following example illustrates the preparation of zinc borate of higher hydration which is obtained by reaction at room temperature such as according to the procedure of Myhren et al., U.S. Pat. No. 2,405,366.

EXAMPLE VI

A zinc sulfate solution was made by adding 659.3 g. of ZnO to 828 g. of 96 percent $H_2SO_4$(diluted 1:4) and was then diluted to 4613 ml. To 948 g. of water, 270 ml. of the $ZnSO_4$ solution and 146 g. borax was added every 7 minutes with continuous agitation at room temperature, until 2476 g. of borax and all the zinc sulfate solution was added. A solution of 225 g. of 50 percent NaOH and 429 g. of water was added slowly over a period of 0.5 hour. The mixture was stirred at room temperature overnight. The solids were removed by filtration, washed with water and methanol and air dried. The product had the following analysis:

ZnO   29.29%
$B_2O_3$   37.76%

Formula: $2.03ZnO \cdot 3B_2O_3 \cdot 9.93H_2O$

A sample was oven dried at 102° C. to give a product of the analysis:

ZnO   31.86%
$B_2O_3$   40.29%

Formula: $2.03ZnO \cdot 3B_2O_3 \cdot 8.01 H_2O$.

The X-ray pattern was consistent with zinc borate of the formula $2ZnO \cdot 3B_2O_3 \cdot 7H_2O$.

The novel zinc borate of this invention has a distinct X-ray diffraction pattern which is different from that of previously prepared zinc borates having a higher water of hydration such as found on ASTM cards 9–88 and 11–279. The X-ray diffraction pattern is a table of the interplanar spacing in Anggstrom units on a film or spectrometer chart and the relative intensities of the lines. The technique employed is that found in *X-ray Diffraction Procedures*, by Harold P. Klug and Leroy E. Alexander (1954), page 235 et seq. The following is the X-ray pattern of the crystalline zinc borate of the present invention.

| d,A | I/I$_1$ | d,A | I/I$_1$ |
|---|---|---|---|
| 5.48 | 11 | 2.60 | 14 |
| 5.00 | 70 | 2.496 | 23 |
| 4.90 | 100 | 2.473 | 19 |
| 4.31 | 81 | 2.446 | 55 |
| 4.08 | 78 | 2.10 | 32 |
| 3.95 | 21 | 2.045 | 16 |
| 3.75 | 70 | 1.98 | 21 |
| 3.69 | 40 | 1.966 | 27 |
| 3.45 | 59 | 1.94 | 11 |
| 3.23 | 26 | 1.869 | 23 |
| 3.10 | 64 | 1.808 | 25 |
| 2.95 | 51 | 1.73 | 15 |
| 2.91 | 44 | 1.667 | 11 |
| 2.85 | 15 | 1.629 | 15 |
| 2.79 | 11 | 1.613 | 15 |
| 2.725 | 26 | 1.585 | 14 |

Since the water content of the compound is determined by difference, the analysis can fall within the range of from about 3.3 to about 3.7 $H_2O$. However, the water of hydration appears to be about $3.5H_2O$ for the pure compound.

The zinc borate of the present invention is especially useful as a fire-retardant additive for various halogenated polymers such as the polyolefins, polyesters, and polyepoxides containing halogen, as well as polyvinyl chloride. Reference is made to a copending application of William G. Woods, et al., Ser. No. 725,169 filed Apr. 29, 1968, which discloses and claims various fire-retardant polymer compositions containing the crystalline zinc borate of the present invention.

Various changes and modifications of the invention can be made and, to the extent that such variations incorporate the spirit of this invention, they are intended to be included within the scope of the appended claims.

We claim:

1. The process for preparing crystalline zinc borate of the formula $2ZnO \cdot 3B_2O_3 \cdot 3.3-3.7H_2O$ which comprises forming an aqueous solution of alkali metal borate and a water-soluble zinc salt having a molar ratio of zinc salt to alkali metal borate of 1–1.5 and maintaining said aqueous solution at a temperature of at least about 70° C. whereby said zinc borate is precipitated.

2. The process according to claim 1 in which said zinc salt is selected from the group consisting of zinc sulfate, zinc bromide, zinc chloride, and zinc nitrate.

3. The process according to claim 1 in which said alkali metal borate is sodium tetraborate.

4. The process according to claim 3 in which the molar ratio of said zinc salt to sodium tetraborate is about 1–1.5.

5. The process according to claim 1 in which seed crystals of previously prepared said zinc borate are present in the reaction mixture.

6. The process in accordance with claim 3 in which a minor amount of zinc oxide is included in the reaction mixture.

7. The process in accordance with claim 6 in which the molar ratio of zinc salt:sodium tetraborate: zinc oxide is about 7:7:1.

8. The process in accordance with claim 1 in which said aqueous solution is maintained at a temperature of about 90°–100bL C.

9. The process in accordance with claim 3 in which a minor amount of sodium metaborate is included in the reaction mixture.

10. The process in accordance with claim 9 in which the molar ratio of zinc salt:sodium tetraborate:sodium metaborate is about 4:3:2.

11. The process in accordance with claim 9 in which said sodium metaborate is formed in situ by addition of sodium hydroxide.

UNITED STATES PATENT OFFICE
CERTIFICATE OF CORRECTION

Patent No. 3,649,172        Dated March 14, 1972

Inventor(s) Nelson P. Nies et al.

It is certified that error appears in the above-identified patent and that said Letters Patent are hereby corrected as shown below:

In Column 1, line 66, that portion of the formula reading "2ZnSO+2Na$_2$B$_4$O$_7$ $\longrightarrow$ 2ZnO·3B$_2$O$_3$·3.5H$_2$O+2Na$_2$SO$_4$+2" should read --2ZnSO$_4$+2Na$_2$B$_4$O$_7$ $\longrightarrow$ 2ZnO·3B$_2$O$_3$·3.5H$_2$O+2Na$_2$SO$_4$+2--;

line 69, that portion of the formula appearing as "2H$_3$BO" should read --2H$_3$BO$_3$--;

line 71, that portion of the formula appearing as "2H$_3$BO" should read --2H$_3$BO$_3$--;

line 73, that portion of the formula appearing as "NaNO$_3$+b8H$_3$BO$_3$" should read --NaNO$_3$+2H$_3$BO$_3$--.

In Column 2, line 3, that portion of the formula appearing as "3.5ZnSO$_4$+3.5Na$_2$B$_4$O$_7$+0.5ZnO $\longrightarrow$ 2(2ZnO·3B$_2$O$_3$·3.5H$_2$" should read --3.5ZnSO$_4$+3.5Na$_2$B$_4$O$_7$+0.5ZnO $\longrightarrow$ 2(2ZnO·3B$_2$O$_3$·3.5H$_2$O)--;

line 4, that portion of the formula appearing as "O)+3.5NaSO$_4$+2H$_3$BO$_3$" should read --+3.5NaSO$_4$+2H$_3$BO$_3$--;

line 11, the letter "h." should read --k.--;

line 11, that portion of the formula appearing as "2ZnSO$_4$+1.5Na$_2$B$_4$O$_7$+NaBO$_2$ $\longrightarrow$ 2ZnO·3B$_2$O$_3$·3.5H$_2$" should read --3.5ZnCl$_2$+3.5K$_2$B$_4$O$_7$+0.5ZnO $\longrightarrow$ 2ZnO·3B$_2$O$_3$·3.5H$_2$O)--;

UNITED STATES PATENT OFFICE
CERTIFICATE OF CORRECTION

Patent No. 3,649,172                         Dated March 14, 1972

Inventor(s) Nelson P. Nies et al.            PAGE - 2

It is certified that error appears in the above-identified patent and that said Letters Patent are hereby corrected as shown below:

In Column 2, line 12, that portion of the formula appearing as "O)+3.5K$_2$SO$_4$+2H$_3$BO$_3$" should read --+3.5K$_2$SO$_4$+2H$_3$BO$_3$--;

line 41, the first appearance of the word "the" should read --The--.

In Column 3, line 47, the numbers "29.29" should read --29.91--.

In Column 4, line 58, the numbers and letters appearing as "100bEC" should read --100°C.--.

Signed and sealed this 22nd day of August 1972.

(SEAL)
Attest:

EDWARD M. FLETCHER, JR.          ROBERT GOTTSCHALK
Attesting Officer                Commissioner of Patents